(12) United States Patent
Wouters et al.

(10) Patent No.: US 7,892,318 B2
(45) Date of Patent: Feb. 22, 2011

(54) CRYSTALLISATION METHOD FOR THE PURIFICATION OF A MOLTEN METAL, IN PARTICULAR RECYCLED ALUMINIUM

(75) Inventors: Huibrecht Adriaan Wouters, Leiden (NL); Andreas Ten Cate, Amsterdam (NL); Elisabeth Maria Beunder, Alkmaar (NL); Willem Boender, Ridderkerk (NL); Marcellus Albertus Hogenboom, Oude Wetering (NL); René Kieft, Beverwijk (NL); Joost Christiaan Storm, Akersloot (NL)

(73) Assignee: Aleris Switzerland GmbH c/o K+P Treuhandgesellschaft, Schaffhausen (CH)

( * ) Notice: Subject to any disclaimer, the term of this patent is extended or adjusted under 35 U.S.C. 154(b) by 0 days.

(21) Appl. No.: 12/304,311

(22) PCT Filed: Jun. 8, 2007

(86) PCT No.: PCT/EP2007/005100
§ 371 (c)(1),
(2), (4) Date: Jun. 30, 2009

(87) PCT Pub. No.: WO2008/000341
PCT Pub. Date: Jan. 3, 2008

(65) Prior Publication Data
US 2010/0024602 A1  Feb. 4, 2010

(30) Foreign Application Priority Data
Jun. 28, 2006  (EP)  .................... 06013339

(51) Int. Cl.
C22B 21/06  (2006.01)
C22B 9/02  (2006.01)
(52) U.S. Cl. .......................................... 75/412; 75/679
(58) Field of Classification Search .................. 75/412, 75/679
See application file for complete search history.

(56) References Cited

U.S. PATENT DOCUMENTS

| | | |
|---|---|---|
| 1,562,090 A | 11/1925 | Hoopes |
| 1,938,101 A | 12/1933 | Hall |
| 3,211,547 A | 10/1965 | Jarrett et al. |
| 3,239,899 A | 3/1966 | Johnson |
| 3,296,811 A | 1/1967 | Stoller |
| 3,303,019 A | 2/1967 | Jacobs |
| 3,308,666 A | 3/1967 | Anderson et al. |
| 3,671,229 A | 6/1972 | Ferber et al. |
| 3,839,019 A | 10/1974 | Bruno et al. |
| 3,840,219 A | 10/1974 | Sheridan et al. |
| 3,840,364 A | 10/1974 | Flemings et al. |
| 3,849,119 A | 11/1974 | Bruno et al. |
| 4,043,802 A | 8/1977 | Esdaile et al. |
| 4,050,683 A | 9/1977 | Langhammer |
| 4,099,965 A | 7/1978 | Beguin et al. |
| 4,133,517 A | 1/1979 | Esdaile et al. |
| 4,222,830 A | 9/1980 | Dawless et al. |
| 4,239,606 A | 12/1980 | Dawless et al. |
| 4,243,211 A | 1/1981 | Leroy et al. |
| 4,273,627 A | 6/1981 | Dawless et al. |
| 4,305,763 A | 12/1981 | Quist et al. |
| 4,379,718 A | 4/1983 | Grantham et al. |
| 4,411,747 A | 10/1983 | Dawless et al. |
| 4,456,480 A | 6/1984 | Wintenberger |
| 4,581,062 A | 4/1986 | Boutin |
| 4,736,314 A | 4/1988 | Riese et al. |
| 4,744,823 A | 5/1988 | Raymond-Seraille |
| 4,781,771 A | 11/1988 | Masumoto et al. |
| 5,057,150 A | 10/1991 | Reeve et al. |
| 5,160,532 A | 11/1992 | Benz et al. |
| 5,221,377 A | 6/1993 | Hunt, Jr. et al. |
| 5,312,498 A | 5/1994 | Anderson |
| 5,405,427 A | 4/1995 | Eckert |

(Continued)

FOREIGN PATENT DOCUMENTS

DE        258 283 A1        7/1988

(Continued)

OTHER PUBLICATIONS

Davis, J.R. (editor), ASM Specialty Handbook, Aluminum and Aluminum Alloys, pp. 207-216 (1993).

(Continued)

Primary Examiner—George Wyszomierski
Assistant Examiner—Tima M McGuthry-Banks
(74) Attorney, Agent, or Firm—Novak Druce + Quigg LLP

(57) ABSTRACT

Method for purifying molten metal having a specific density and including one or more foreign elements to be removed, by (a) cooling the molten metal to a eutectic temperature to simultaneously form purified metal crystals and crystals including at least one foreign element, and (b) separating at least some of the purified metal crystals from the crystals including at least one foreign element by adjusting the molten metal specific density within a range delimited by a lower value being specific density of the purified metal crystals and an upper limit being specific density of the crystals including the at least one foreign element. The molten metal specific density is adjusted to this range by addition of a metal to alter the molten metal specific density and maintained within this range during separation. The method is advantageously applicable for purification of aluminium melts from recycle aluminium and aluminium scraps.

14 Claims, No Drawings

U.S. PATENT DOCUMENTS

| | | | |
|---|---|---|---|
| 5,427,602 A | 6/1995 | DeYoung et al. | |
| 5,741,348 A | 4/1998 | Van der Donk et al. | |
| 5,968,223 A | 10/1999 | Eckert | |
| 6,143,070 A | 11/2000 | Bliss et al. | |
| 6,224,648 B1 | 5/2001 | Verdoes et al. | |
| 6,290,900 B1 | 9/2001 | Hatano et al. | |
| 6,355,085 B1 | 3/2002 | Pillin | |
| 6,482,386 B2 | 11/2002 | Atchetee et al. | |
| 6,909,505 B2 | 6/2005 | Lucas et al. | |
| 6,972,110 B2 | 12/2005 | Chakrabarti et al. | |
| 7,419,530 B2 | 9/2008 | De Vries et al. | |
| 7,442,228 B2 | 10/2008 | De Vries | |
| 7,531,023 B2 * | 5/2009 | De Vries | 75/679 |
| 7,537,639 B2 | 5/2009 | De Vries | |
| 7,648,559 B2 | 1/2010 | De Vries et al. | |
| 2004/0261572 A1 | 12/2004 | De Vries | |
| 2005/0145071 A1 | 7/2005 | Cates | |
| 2005/0178239 A1 | 8/2005 | De Vries et al. | |
| 2007/0023110 A1 | 2/2007 | De Vries | |
| 2009/0301259 A1 | 12/2009 | De Vries et al. | |
| 2009/0308203 A1 | 12/2009 | Wouters et al. | |
| 2010/0024602 A1 | 2/2010 | Wouters et al. | |

FOREIGN PATENT DOCUMENTS

| | | |
|---|---|---|
| DE | 43 25 793 A1 | 2/1995 |
| EP | 0099948 A1 | 2/1984 |
| EP | 0375308 A1 | 6/1990 |
| EP | 0587274 A1 | 3/1994 |
| EP | 0696646 A2 | 2/1996 |
| EP | 0745693 A1 | 12/1996 |
| EP | 0829552 A1 | 3/1998 |
| EP | 1 288 319 A1 | 3/2003 |
| EP | 1 380 659 A1 | 1/2004 |
| FR | 1594154 A | 6/1970 |
| GB | 615590 A | 1/1949 |
| GB | 885503 A | 12/1961 |
| GB | 974829 A | 11/1964 |
| GB | 1352567 A | 5/1974 |
| GB | 2154315 A | 9/1985 |
| JP | 52135797 | 11/1977 |
| JP | 55050442 | 4/1980 |
| JP | 57152435 | 9/1982 |
| JP | 58104132 | 6/1983 |
| JP | 59028538 | 2/1984 |
| JP | 59205424 | 11/1984 |
| JP | 60234930 | 11/1985 |
| JP | 7070666 | 3/1995 |
| RU | 2105084 | 2/1998 |
| RU | 2112065 | 5/1998 |
| SU | 1589173 | 8/1990 |
| WO | 9827240 | 6/1998 |
| WO | 02052053 | 7/2002 |
| WO | 2004005558 A1 | 1/2004 |
| WO | 2004005559 | 1/2004 |
| WO | 2005/095658 A1 | 10/2005 |

OTHER PUBLICATIONS

U.S. Appl. No. 11/492,226-Office Action mailed Sep. 9, 2008, 11 pages.

Hanumanth et al., "Particle Sedimentation During Processing of Liquid Metal-Matrix Composites", Metallurigical Transaction B., vol. 23B, pp. 753-763 (1992).

Isenberg-O'Loughlin, Jo, "Taming the Thunder," Metal Producing. vol. 33. pp. 21-23. Sep. 1994.

L.C. Bartel et al., An Electrical Resistivity Measurement in Molten Basalt During the 1983 Kilauea Eruption, Bull. Volcanol., vol. 46.3, pp. 271-276 (1983).

U.S. Appl. No. 10/598,731-Notice of Allowance mailed Jan. 23, 2009, 7 pages.

Perry's Chemical Engineers' Handbook, Seventh Edition, McGraw-Hill, 1997, pp. 18-5 to 18-13.

Proceedings of 4th Int. Symposium on Recycling of Metals & Engineered Materials, TMS 2000, Kahveci et al., "Refining of a 5XXX Series Aluminum Alloy Scrap By Alcoa Fractional Crystallization Process," p. 979-91(2000).

U.S. Appl. No. 10/488,042-Notice of Allowance in mailed Jun. 2, 2008.

U.S. Appl. No. 10/488,042-Notice of Allowance mailed Mar. 18, 2008.

U.S. Appl. No. 10/488,042-Office action mailed May 11, 2007, 9 pages.

U.S. Appl. No. 10/488,042-Office action mailed Oct. 16, 2007, 5 pages.

U.S. Appl. No. 10/491,278-Office action mailed Dec. 3, 2007, 9 pages.

U.S. Appl. No. 10/491,278-Office action mailed Jun. 26, 2007, 9 pages.

U.S. Appl. No. 10/516,888-Notice of Allowance mailed Jan. 10, 2008.

U.S. Appl. No. 10/516,888-Notice of Allowance mailed Jun. 2, 2008.

U.S. Appl. No. 10/516,888-Notice of Allowance mailed Oct. 7, 2009.

U.S. Appl. No. 10/516,888-Office action mailed Jan. 13, 2009, 6 pages.

U.S. Appl. No. 10/516,888-Office action mailed Jul. 18, 2007, 11 pages.

U.S. Appl. No. 10/516,888-Office action mailed Sep. 3, 2008, 8 pages.

U.S. Appl. No. 10/516,888-Office action mailed Apr. 20, 2009.

U.S. Appl. No. 10/516,889-Office action mailed Aug. 30, 2007, 14 pages.

U.S. Appl. No. 10/516,889-Office action mailed Jan. 31, 2008, 5 pages.

U.S. Appl. No. 10/516,889-Office action mailed May 30, 2008, 6 pages.

U.S. Appl. No. 10/577,354-Notice of Allowance mailed Mar. 5, 2009, 7 pages.

U.S. Appl. No. 10/577,354-Office Action mailed Nov. 18, 2008, 9 pages.

U.S. Appl. No. 10/516,889-Notice of Allowance mailed Jul. 10, 2008.

U.S. Appl. No. 10/306,023-Office action mailed Nov. 3, 2010, 7 pages.

* cited by examiner

CRYSTALLISATION METHOD FOR THE PURIFICATION OF A MOLTEN METAL, IN PARTICULAR RECYCLED ALUMINIUM

This application is a §371 National Stage Application of International Application No. PCT/EP2007/005100, filed on 8 Jun. 2007, claiming the priority of European Patent Application No. 06013339.4 filed on 28 Jun. 2006.

FIELD OF THE INVENTION

The present invention relates to a method for the purification of a molten metal comprising one or more foreign elements, in particular to a refining method for non-ferrous metals such as recycled aluminium scrap.

BACKGROUND TO THE INVENTION

As will be appreciated herein below, except as otherwise indicated, alloy designations refer to the Aluminum Association designations in Aluminum Standards and Data and the Registration Records, as published by the Aluminum Association in 2006.

For any description of alloy compositions or preferred alloy compositions, all references to percentages are by weight percent unless otherwise indicated.

In general the purification of molten metals can be economically very profitable as it allows scrap metals which may contain different alloying or foreign elements and different amounts of the foreign elements to be processed to regain a standard purity and a higher economic value.

Such a purification method is known in the prior art, for example from international patent application WO-2005/095658-A1. In this method the molten metal is cooled to a eutectic temperature in order to simultaneously form purified metal crystals and crystals comprising at least one foreign element. Compared to the starting composition of the molten metal the purified metal crystals are depleted of foreign elements, while the foreign element(s) are concentrated in the other crystals comprising at least one foreign element. Then at least some of the crystals comprising at least one foreign element are separated from the purified metal crystals by using a solid-solid separation technique. This known purification method is beneficial in view of economic feasibility for e.g. purifying scrap such as recycled aluminium, because a relatively pure metal as purified metal crystals can be obtained in a high yield. The solid-solid separation step is exemplified by inter alia a liquid-solid pre-separation step wherein both types of crystals are separated from the molten metal as a mixture and then this mixture is added to molten salt with a specific density between that of the specific densities of the purified metal crystals and the crystals comprising at least one foreign element so that some of the crystals sink into the salt whilst the remainder float on the salt.

Other methods for solid-solid separation described in international patent application WO-2005/095658-A1 use centrifugal forces, an electromagnetic field and gas bubbles based floatation. Alternative pre-separation steps for separating both types of crystals from the total amount of molten metal are also described, such as filtration, centrifugation and a salt layer contacting step using stirring. In this patent document it has been recognised that solid-solid separation generally becomes difficult when the solid fraction is above 30%. In this process both types of crystals form simultaneously and settle together in the molten metal thereby forming a mixture of crystals. Although various techniques have been described for separating this mixture into its components, it has appeared that these techniques render the process amongst others complex and laborious to carry out.

Another purification method concerns the so-called fractional crystallisation as described in for example U.S. Pat. No. 4,273,627. In this method a hypo-eutectic molten metal comprising one or more foreign elements is cooled to achieve partial solidification. The molten metal is cooled to just above a eutectic temperature. The crystals that form in the molten metal have a purer composition than that of the molten metal that is used as a starting point. These crystals can then be separated from the remaining molten metal by means of a solid-liquid separation technique. This process however has the drawback that when the initial concentration of foreign elements is high the amount of purified metal obtained is relatively low and the amount of by-product generated is high. This means that the fractional crystallisation method may not be economically feasible for e.g. purifying scrap.

Another purification method is by means of separation of foreign elements in which a hyper-eutectic molten metal comprising one or more foreign elements is cooled to achieve partial solidification. The molten metal is cooled to just above the eutectic temperature. The foreign element(s) solidify to form crystals comprising at least one foreign element and/or pure crystals of a foreign element which can then be separated from the molten metal using a solid-liquid separation technique. A hypo-eutectic molten metal can be made hyper-eutectic by the addition of certain elements as disclosed in U.S. Pat. No. 5,741,348. This method has the disadvantage that the remaining liquid product obtained is not very pure and thus is of relatively low value.

And EP-1288319-A1 discloses a method for the purification of molten aluminium whereby the composition of the molten aluminium is alternated between a hypo-eutectic and hyper-eutectic composition by the addition of specific alloying elements. In particular the addition of Mn is disclosed to assist in the removal of Fe by the formation of eutectic particles or intermetallic particles which are separated out from the molten aluminium.

There is an ongoing need in the art for simplified and economical purification processes.

SUMMARY OF THE INVENTION

An object of the present invention is to provide a method or process for the purification of a molten metal comprising one or more foreign elements.

Another object of the present invention is to provide a process for the purification of a molten metal comprising one or more foreign elements, wherein the separation of the two kinds of crystals may be achieved in-situ.

A further object of the invention is to provide a process which is easy to operate continuously.

These and other objectives and further advantages are met or exceeded by the present invention concerning a method for the purification of a molten metal, the molten metal having a specific density and comprising one or more foreign elements, the method comprises the steps of:

(a) a cooling step wherein the molten metal is cooled to a eutectic temperature to simultaneously form purified metal crystals and crystals comprising at least one foreign element; and (b) a separation step wherein at least some of the purified metal crystals are separated from the crystals comprising the at least one foreign element by adjusting the specific density of the molten metal within a range delimited by a lower value being the specific density of the purified metal crystals and by an upper limit being the specific density of the crystals comprising at least one foreign element, and wherein the specific density of the molten metal is adjusted to this range by the addition of a metal to the molten metal and wherein the specific density of the molten metal is maintained within this range during separation.

DETAILED DESCRIPTION OF THE PREFERRED EMBODIMENTS

The invention provides a method for the purification of a molten metal such as molten aluminium or molten aluminium originating from recycled scrap material, the molten metal having a specific density and comprising one or more foreign elements which are to be removed, the method comprises the steps of:

(a) a cooling step wherein the molten metal (3) is cooled to a eutectic temperature to simultaneously form purified metal crystals (1) and crystals (2) comprising at least one foreign element, and (b) a separation step carried out at the eutectic temperature and wherein at least some of the purified metal crystals (1) are separated from the crystals (2) comprising the at least one foreign element by adjusting the specific density of the molten metal (3) within a range delimited by a lower value being the specific density of the purified metal crystals (1) and by an upper limit being the specific density of the crystals (3) comprising at least one foreign element, and wherein the specific density of the molten metal (3) is adjusted to this range by the addition of a metal (4) or alloying element to the molten metal (3) and wherein the specific density of the molten metal (3) is maintained within this range during separation.

In the method according to the invention a separation between purified metal crystals and the crystals comprising at least one foreign element is carried out while the specific density of the molten metal is adjusted purposively between those of these different types of crystals to be separated from each other. As the different types of crystals have distinct specific densities the molten metal having a specific density in between will function as a separating medium, physically spacing apart one type of crystals from the other. Thus a spatial separation will occur. This allows in the purification method for a subsequent removal step in essence based on a liquid-solid separation for each of the types of crystals, which is not too difficult to accomplish.

In the context of this application the term "foreign element" is used to indicate an element whose concentration in the purified metal should be reduced as it decreases the value thereof.

The term "crystals comprising at least one foreign element" as used herein includes intermetallics which are formed when atoms of two or more foreign elements combine in certain proportions to form crystals with a different structure from that of any of the individual foreign elements and also pure crystals of a foreign element.

Elements present in the molten metal but which are not foreign elements, because their presence is not undesirable in the purified product, may be present in the purified metal crystals as well.

The term "eutectic temperature" refers to a temperature at which at least two solid phases form simultaneously. Eutectic temperature thus refers to the eutectic point for a binary system and to a temperature along the eutectic valley for a ternary, quaternary or higher order system. Phase diagrams of most alloys concerned are readily available from handbooks and basic textbooks, as well as the relevant data of specific densities or calculation methods thereof.

In the purification method according to the invention the molten metal is cooled to a eutectic temperature. If the concentration of foreign element(s) in the molten metal to be subjected to the purification method according to the present invention, is substantially greater than the solid solubility of the foreign element(s) at the eutectic temperature and if the partition coefficient is less than the value one, the product obtained as purified metal crystals is consistently of relatively high purity and the yield is also relatively high. A product obtained in the form of the purified metal crystals contains substantially less of the foreign element(s) in comparison with the concentration of the foreign element(s) originally present in the molten metal and the amount of by-product is minimised. The crystals comprising at least one foreign element contain substantially more of the foreign element(s) in comparison with the concentration of the foreign element(s) originally present in the molten metal. The partition coefficient is the ratio of the concentration of the foreign element(s) in the purified metal crystals to the concentration of the foreign element(s) originally present in the molten metal. The partition coefficient may preferably be less than or equal to 0.5 or more preferably less than or equal to 0.25 in order to obtain higher amounts of purer product.

Examples of partition or distribution coefficients are 0.03 for aluminium containing iron as a foreign element, 0.1 for aluminium containing silicon as a foreign element and 0.93 for aluminium containing manganese as a foreign element. The proceedings of the Fourth International Symposium On Recycling Of Metals And Engineered Materials TMS, 2000, p. 979-991 *"Refining of a 5XXX series aluminium alloy scrap by Alcoa fractional crystallisation process"* by Ali I Kahveci and Ali Unal, lists the partition or distribution coefficients for some impurities in aluminium, and incorporated herein by reference.

In general the method according to this invention like the method known from WO-2005/095658 has a higher yield than a fractional crystallisation method operated at just above the eutectic temperature and has a better product purity compared to a method comprising separation of foreign elements which is also carried out at just above the eutectic temperature.

Accurate temperature control of the method according to the invention is not necessary unlike the known fractional crystallisation and separation of foreign elements methods. When using the method of the present invention the system is substantially self-regulating and maintains itself at eutectic temperature in a large solidification range. A solid fraction measurement, which need not be stringently accurate, can be used to control the process. An energy measurement can also be used to control the process.

In an embodiment also during the cooling step the specific density of the molten metal is within the range delimited by the specific density of the purified metal crystals and the specific density of the crystals comprising at least one foreign element. Crystals of one type typically the purified metal crystals, will start to rise once they are formed. Thus eventually these crystals will float in the molten metal. Crystals of the other type typically the crystals comprising at least one foreign element, will start to settle once they are formed. Thus eventually these crystals will rest on the bottom of the reactor, in which the separation is carried out. As the separation into different crystal types is performed in-situ, a subsequent removal step for a crystal type can be carried out more easily and independently in time and place, e.g. by overflow and sedimentation respectively. This is an advantage over the prior art, also in view of the totally different amounts obtained of both types of crystals.

In another embodiment after the cooling step at least some of the crystals formed together with a small amount of molten metal are removed from the main molten metal. After removal the crystals removed are separated from the small amount of molten metal, when the specific density is within the range discussed above.

Advantageously in the method according to the invention the specific density of the molten metal is adjusted and maintained within the range defined above by the addition of a metal or alloying element thereby increasing the specific density of the molten metal. Usually, and in particular in case of aluminium, the molten metal liquid phase in unmodified condition has a specific density that is lower than the specific densities of the purified metal crystals and of the crystals having at least one foreign element. Therefore in such a situation the crystals of both types settle together in the bottom layer of the molten metal, from which they are not easy to be discharged separately. The one or more metals or metallic compounds having a suitable density (also referred to as high density additive) are added in an amount sufficient to raise the specific density of the molten metal to the required level but lower than the highest specific density of the crystal types to be separated and higher than the lowest specific density of the crystal types to be separated. The metal or alloying element purposively added easily dissolves in the molten metal. The high density additives are selected advantageously with a view to the further application, processing or use of the purified metal crystals obtainable. The proportions of the high density additives that are to be added in order to adjust the specific density of the molten metal within the range discussed above can be easily calculated and experimentally verified.

In a preferred embodiment thereof the metal or alloying element increasing the density of the molten metal is a metal being substantially insoluble in the purified metal crystal phase. It will be understood that the expression "metal being essentially insoluble in the purified metal crystal phase" includes metals having a low solubility, e.g. less than 0.1 wt. %. For example, in the case of purification of molten aluminium according to the invention such metals or alloying elements include lead (Pb), tin (Sn), and mercury (Hg). Lead and tin both have a solubility of less than 0.1% in the purified Al crystals. The purified Al crystals will float on the molten metal, while the other crystals comprising at least one foreign element will settle. The purified Al crystals obtained are suitable for use in machining alloys like AA6082, AA6262, AA2011 and AA2111.

In another preferred embodiment the metal or alloying element increasing the density of the molten metal is soluble in the purified metal crystal phase. Metals or alloying elements of this kind are very highly soluble in the molten metal. Suitable examples thereof in case of aluminium include in particular copper (Cu) and zinc (Zn). The purified Al crystals will float on the molten metal. The purified Al crystals comprising Cu or Zn are well suited for use in the AA2xxx series and AA7xxx series aluminium alloys.

The method of the present invention is particularly suitable for purifying non-ferrous metals, more in particular molten aluminium, comprises at least one foreign element. Primary aluminium production from aluminium ore is very energy intensive and expensive making recycling more viable. However, using the prior art methods of metal purification it is still often not economically viable to purify aluminium scrap without adding relatively pure primary aluminium or smelter grade aluminium to the scrap to effectively dilute the foreign element(s) present. Using the method of the present invention large volumes of aluminium alloy scrap can be cost-effectively purified without requiring the addition of large amounts of primary grade aluminium.

The present invention can advantageously be used to remove one or more foreign elements such as iron (Fe), silicon (Si), copper (Cu), lithium (Li), manganese (Mn), zinc (Zn), and magnesium (Mg) which are frequently present in aluminium alloy scrap in varying quantities.

The present invention is advantageously applied in a continuous process or operation, wherein the purified metal crystals and crystals comprising at least one foreign element are formed and separated in a continuous manner. By continuously supplying molten metal at or above the eutectic temperature to molten metal which has already been cooled to the eutectic temperature, and in which crystals comprising at least one foreign element have already been formed, and maintaining the temperature of the molten metal at the eutectic temperature the crystals comprising at least one foreign element are encouraged to grow larger. This is because the crystals comprising at least one foreign element which were already present in the molten metal act as nucleation sites for the crystals comprising at least one foreign element which form out of the molten metal subsequently added. The greater the size of the crystals comprising at least one foreign element the relatively easier they will settle. Both the purified metal crystals and crystals comprising at least one foreign element can grow to average sizes in a range of larger than 50 μm and up to 200 μm.

Preferably the purified metal crystals as well as the crystals comprising at least one foreign element are separated from the molten metal without a significant amount of molten metal also being discharged. Any molten metal discharged together with the crystals can be returned to the main charge of molten metal after further solid-liquid separation. As the amount of purified metal crystals is significantly larger than the amount of crystals comprising at least one foreign element, advantageously the purified metal crystals are separated from the molten metal in a continuous manner, while the crystals comprising at least one foreign element may be separated from the molten metal in a discontinuous manner, such as periodically. For example these latter crystals are collected by sedimentation, after which they are removed when a predetermined amount thereof has been obtained.

The purified metal crystals thus separated can be subjected to further purification processes, typically also crystallisation processes, thereby obtaining an additionally purified metal product having significantly reduced amounts of foreign elements. The resulting product can be used for generic aluminium alloy applications.

Usually the crystals comprising at least one foreign element do not need to be subjected to further purification steps. The by-product crystals are used or disposed of as they are. If desired, these crystals can be further purified by e.g. crystallisation processes. It should be noted that within the fairly large eutectic temperature range further choices can be made to optimise the size, shape and composition of the by-product crystals.

It is also conceivable that the molten metal comprising one or more foreign elements is subjected to a fractional crystallisation process and a solid-liquid separation technique before the remaining molten metal is cooled to a eutectic temperature to simultaneously form purified metal crystals and crystals comprising at least one foreign element according to the invention. By subjecting the molten metal comprising one or more foreign elements to a fractional crystallisation process and a solid-liquid separation technique a large amount of purified metal crystals or crystals comprising at least one foreign element (depending from the starting material having a hypo-eutectic or hyper-eutectic composition) may be separated from the remaining molten metal before it is cooled to the eutectic temperature. Subjecting the molten metal comprising one or more foreign elements to a fractional crystallisation process and a solid-liquid separation technique before the remaining molten metal is cooled to a eutectic temperature according to the present method can be used in situations where the concentration of foreign element(s) in the molten metal to be subjected to the purification method according to the invention, is initially less than the solid solubility of the foreign element(s) at a eutectic temperature. After the formation and separation of the purified metal crystals the concentration of foreign elements in the remaining molten metal may be greater than the solid solubility of the foreign element(s) at eutectic temperature. Then the remaining molten metal can be purified effectively by the method according to the invention.

Subjecting the molten metal comprising one or more foreign elements to a fractional crystallisation process and a solid-liquid separation step before the remaining molten metal is cooled to a eutectic temperature is most preferably used for a non-continuous or batch process.

The process can be carried out using devices as disclosed in WO-2005/09568 A1, e.g. continuously in a continuous crystalliser comprising e.g. a cooling vessel as well as a feed system for one or more high density additives. Molten metal e.g. aluminium comprising one or more foreign elements like Fe and/or Si, is cooled to a eutectic temperature in the vessel to simultaneously form purified aluminium crystals and crystals comprising at least one foreign element, while the specific density of the molten metal is within the range of which the lower and upper limit is determined by the specific densities of these types of crystals. The solid fraction of the contents of the vessel is substantially maintained at e.g. 10%. As soon as the solid fraction becomes higher than 10% the cooling is reduced and as soon as the solid fraction falls below 10% the cooling is increased. Simultaneously the purified aluminium crystals and crystals comprising at least one foreign element are removed from the molten aluminium at a rate which equals the formation rate. This means that although the composition in the vessel is eutectic and stays eutectic, the composition of the continuous input of molten aluminium comprising foreign element(s) determines how much product and by-product are formed. High density additives are added either continuously either periodically to adjust and maintain the specific density of the molten metal at the required level.

The invention will now be illustrated with reference to non-limiting embodiments according to the invention.

EXAMPLES

Example 1

This qualitative example relates to a batch mode of operation of the process according to the present invention, wherein a high density additive with low solubility in the purified metal crystal phase is added to an almost eutectic molten metal in order to bring the specific density of the molten metal between the specific density of the purified metal crystals and the specific density of the crystals comprising one or more foreign elements.

A crystallisation experiment was carried out on an aluminium alloy comprising 1 wt % of each of Fe, Mn, and Si. This is a composition near the eutectic one. The specific density of this eutectic aluminium melt is about 2.4 g/cm$^3$. Tin was added to the melt in an amount within the range of 7.5 to 25 wt. %, thereby raising the specific density within the range of 2.6 to 2.9 g/cm$^3$. The specific density of the purified metal crystals is about 2.6 g/cm$^3$, while the crystals enriched in Fe, Mn and Si have a density of about 3.5 g/cm$^3$. In particular 10% tin was added to the near-eutectic melt and the temperature of the furnace was gradually lowered until the onset of crystallisation occurred. After slow suspension crystallisation of a batch of about 8 kg aluminium alloy over a period of time of several hours, a final product was obtained comprising an upper aluminium enriched phase separated from a lower aluminium depleted phase. The aluminium enriched phase comprised granular purified Al crystals, while the lower phase consisted of settled cubic crystals that were identified as Al6Mn-type intermetallic crystals. A separation zone having a very fine structure indicating the clear aluminium liquid was present between the floating aluminium enriched phase and the intermetallic phase.

Example 2

This example shows a continuous mode of operation of the method according to the invention wherein elements soluble in the purified metal crystals are used.

An aluminium-based feed comprising 1 wt. % of each of Fe, Mn, and Si was fed continuously to a suspension crystalliser at a rate of 1 ton/hour, while 35 kg/hr of copper was added. The suspension crystalliser equipped with a mechanical stirrer was operated at a steady state temperature of 562° C. This value corresponds to 20 wt. % solids fraction. The aluminium suspension thus obtained had a liquid phase having a density of 2.9 g/cm$^3$, the primary aluminium crystals had a density of 2.6 g/cm$^3$ and the intermetallic phase had a density of 3.4 g/cm$^3$. Separation was effected in an in-line separator, while the molten liquid was returned to the suspension crystalliser. At a separation efficiency of 100% the resulting aluminium-based phase comprised of purified metal crystals containing 3.5 wt. % Cu. The content of the three alloying or foreign elements Fe, Mn and Si was clearly reduced in the aluminium enriched phase to 0.005% Fe, 0.5% Si and 0.07% Mn by weight. This latter phase was separated at a rate of 932 kg/hr. A by-product stream comprising an intermetallics phase of Fe 14.6, Si 8.0, Mn 13.7 and Cu 2.0 wt. %, remainder Al was separated at a rate of 68 kg/hr.

Having now fully described the invention, it will be apparent to one of ordinary skill in the art that many changes and modifications can be made without departing from the spirit or scope of the invention as herein described.

The invention claimed is:

1. Method for the purification of a molten metal, the molten metal having a specific density and comprising one or more foreign elements, the method comprises the steps of:
    (a) a cooling step wherein the molten metal is cooled to a eutectic temperature to simultaneously form purified metal crystals and crystals comprising at least one foreign element, and
    (b) a separation step wherein at least some of the purified metal crystals are separated from the crystals comprising the at least one foreign element by adjusting the specific density of the molten metal within a range delimited by a lower value being the specific density of the purified metal crystals and by an upper limit being the specific density of the crystals comprising at least one foreign element, and wherein the specific density of the molten metal is adjusted to this range by the addition of a metal to the molten metal and wherein the specific density of the molten metal is maintained within this range during separation.

2. Method according to claim 1, wherein the metal to adjust the specific density of the molten metal is a metal being substantially insoluble in the purified metal crystal phase.

3. Method according to claim 2, wherein the molten metal is aluminium and the metal being substantially insoluble in the purified aluminium crystals is selected from the group consisting of Sn, Pb, and Hg.

4. Method according to claim 1, wherein the metal to adjust the specific density of the molten metal is a metal being soluble in the purified metal crystals.

5. Method according to claim 4, wherein the molten metal is aluminium and the metal being soluble in the phase of the purified metal crystals is selected from the group consisting of Cu and Zn.

6. Method according to claim 1, wherein the foreign element(s) comprise one or more selected from the group consisting of Cu, Fe, Li, Mg, Mn, Si, and Zn.

7. Method according to claim 1, wherein the separation step comprises a solid-liquid separation wherein crystals floating in the molten metal are removed from the molten metal.

8. Method according to claim 7, wherein the purified metal crystals floating in the molten metal are removed from the molten metal.

9. Method according to claim 1, wherein the separation step comprises a solid-liquid separation wherein crystals are separated by sedimentation.

10. Method according to claim 9, wherein the crystals comprising the least one foreign element are separated by sedimentation.

11. Method according to claim 1, wherein the purified metal crystals and crystals comprising at least one foreign element are formed and separated in a continuous operation.

12. Method according to claim 1, wherein the molten metal comprising one or more foreign elements is subjected to a fractional crystallisation process and a solid-liquid separation technique prior to the cooling step (a).

13. Method according to claim 1, wherein after separation the purified metal crystals are subjected to an additional purifying step.

14. Method according to claim 1, wherein after separation the crystals comprising at least one foreign element are subjected to an additional purifying step.

* * * * *